United States Patent [19]

Claesson

[11] 4,147,445

[45] Apr. 3, 1979

[54] COUPLING ARRANGEMENT

[76] Inventor: Per-Góran Claesson, Osterhagens Gard, 142 00 Trangsund, Sweden

[21] Appl. No.: 879,598

[22] Filed: Feb. 21, 1978

[30] Foreign Application Priority Data

Feb. 24, 1977 [SE] Sweden ................................ 7702033

[51] Int. Cl.[2] ................................................ F16C 3/10

[52] U.S. Cl. ...................................... 403/372; 74/553; 16/121; 292/349

[58] Field of Search .................. 403/372, 371; 16/118, 16/121; 74/553; 292/349

[56] References Cited

U.S. PATENT DOCUMENTS

| | | | |
|---|---|---|---|
| 2,061,811 | 11/1936 | Sinko | 403/225 |
| 3,154,051 | 10/1964 | Durst et al. | 74/553 UX |
| 3,376,057 | 4/1968 | Van Buren, Jr. | 16/121 X |
| 3,994,608 | 11/1976 | Swiderski et al. | 403/372 |

FOREIGN PATENT DOCUMENTS

| | | | |
|---|---|---|---|
| 2103402 | 8/1972 | Fed. Rep. of Germany | 16/118 |

*Primary Examiner*—Andrew V. Kundrat
*Attorney, Agent, or Firm*—Burns, Doane, Swecker & Mathis

[57] ABSTRACT

A coupling arrangement between a shaft and a knob adapted for rotating the shaft, the knob being provided with a recess having a cross-sectional area which is substantially greater than the cross-sectional area of the shaft, and having a sleeve arranged to encircle the shaft with its inner surface and with its outer surface intended to be encircled by the recess in the knob. The outer surface of the sleeve has a cross-sectional area which is somewhat larger than the cross-sectional area of the recess of the knob. The knob is pressed over the sleeve and as a result of its elasticity imparts to the sleeve a compressing force which acts on the shaft and thereby presses the sleeve and the knob into firm, co-action with the shaft.

8 Claims, 6 Drawing Figures

COUPLING ARRANGEMENT

FIELD OF THE PRESENT INVENTION

The present invention relates to a coupling arrangement, and more specifically, but not exclusively, to a coupling arrangement for connecting a shaft to a knob or wheel adapted to rotate said shaft. The knob is provided with a recess having a cross-sectional area which is much greater than the cross-sectional area of the shaft, and said arrangement comprises further a sleeve arranged to be located between the knob and the shaft, seated therein in a manner such as to fill the space presented between the mutually opposing surfaces of said shaft and said knob when said knob is seated on said shaft.

DESCRIPTION OF THE PRIOR ART

Various embodiments of such coupling arrangements are known to the art. Normally, these known coupling arrangements are especially designed for a particular use within a specific technical field.

With regard to the coupling arrangement of the present invention, said arrangement shall preferably be used for so-called setting knobs adapted to rotate shafts when, preferably, setting electrical elements, such as settable resistances, capacitors and the like.

Difficulties are encountered, particularly within the last mentioned technical field, in obtaining a secure fit of the knob to the shaft. One disadvantage with previously known coupling arrangements for such setting knobs used for setting electrical elements such as resistances, capacitors and the like is that it is time consuming to couple the knob to the shaft. At the same time the structural design of the coupling arrangement itself is complicated and the coupling arrangement is expensive to produce.

A further disadvantage associated with this technical field is that the settable electrical elements are normally firmly connected, via their own electrical connecting means, to a printed circuit card, and consequently the element can not be firmly mounted on the card because of the week connecting means. When the element is not firmly mounted on the card it is extremely difficult, if not impossible, to press a knob axially onto a shaft, since excessive pressure will damage the attachment of the settable electrical element. Even if the pressure required to push the knob onto the shaft is not of such magnitude as to cause damage, it is still liable to deform the electrical conductors on the card, said conductors being arranged to co-operate with the electrically settable resistance or capacitor.

OBJECTS OF THE PRESENT INVENTION

The aforementioned disadvantages are fully eliminated by means of a coupling arrangement according to the invention, in that the arrangement according to the invention comprises an extremely simple coupling element and enables the knob to be mounted on the shaft without it being necessary to apply an axial force thereonto.

The features of a coupling arrangement according to the invention are set forth in the accompanying claims.

BRIEF DESCRIPTION OF THE ACCOMPANYING DRAWING

So that the invention will be more readily understood and further features thereof made apparent, an exemplary embodiment of the invention will now be described with reference to the accompanying drawing, in which FIG. 1 is a side view of a shaft to which the coupling arrangement according to the present invention can be applied, FIG. 2 is a side view, partly in section, of a sleeve forming part of the coupling arrangement, FIG. 3 is a side view, partly in section, of a knob forming part of the coupling arrangement, FIG. 4 is a front view of the sleeve shown in FIG. 2, FIG. 5 illustrates a simple stop member arranged to prevent axial forces being applied to the shaft when coupling the knob and sleeve thereto, and FIG. 6 illustrates a preferred embodiment of the use of the coupling arrangement according to the invention.

DESCRIPTION OF THE PREFERRED EMBODIMENT

Figure 1:
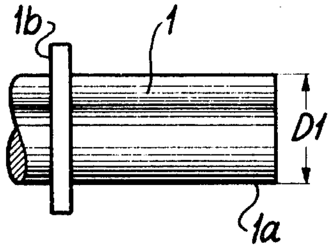
Figure 2:
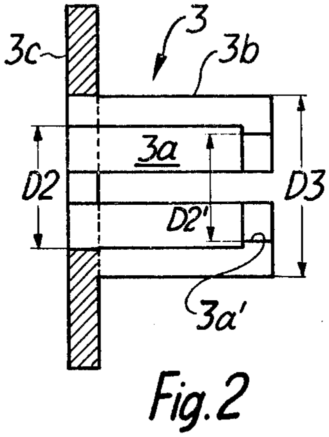
Figure 3:
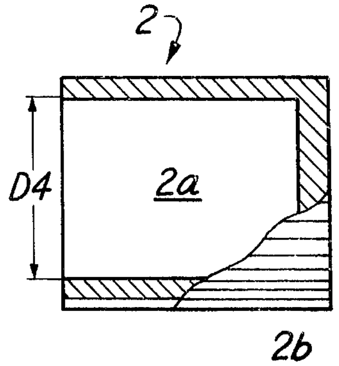

FIGS. 1, 2 and 3 illustrate, in an exploded view, a shaft 1 and two parts 2 and 3 of the coupling arrangement according to the invention. The coupling arrangement shall act between the shaft 1 and a knob 2 by which the shaft shall be rotated. The knob 2 is provided with a recess 2*a* whose cross sectional area is substantially greater than the cross sectional area of the shaft. The part 3 of the coupling has the form of a sleeve, which shall embrace the shaft with its inner surface 3*a* and which has an outer surface 3*b* which the recess 2*a* of the knob encircles.

In the illustrated embodiment, the knob 2 is planar circular in its recessed portion 2*a* whilst the remainder of the knob is cylindrical in shape, the diameter of the shaft 1, designated "D1" being identical to the diameter "D2" of the bore of the sleeve 3.

The diameter "D3" of the outer surface 3*b* of the sleeve 3 is somewhat larger than the diameter "D4" of the recess 2*a* in the knob 2.

Figure 6:
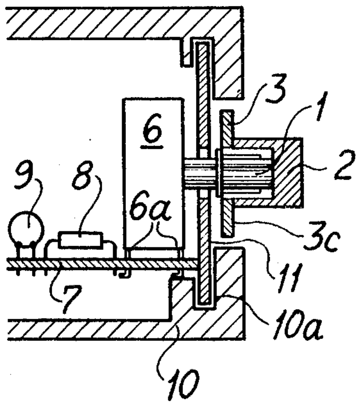

Thus, the outer surface 3*b* of the sleeve is formed into a cross section which is somewhat larger than the cross section of the recess 2*a* of the knob and thereby ensures a press fit between the knob 2 and the sleeve 3, when the knob is forced to move over the outer surface 3*b* of the sleeve 3 to the position shown in FIG. 6. As a result of this press-fit, the knob 2 will expand and the knob will exert a force over the sleeve 3 and thereby, as a result of its elasticity, the sleeve 3 will be allotted a compressing force, which acts on the shaft 1. In this way the sleeve 3 is forced by the knob 2 into firm, friction grip with the shaft 1.

As will be seen from FIG. 2, the inner surface 3*a* of the sleeve is provided with a shoulder 3*a*′ whereby the sleeve 3 has a constriction with a diameter "D2′" which is smaller than the diameter "D2". Only the shoulders 3*a*′ will forcibly abut the shaft 1, owing to the compressing force of the knob 2 over the outer surface 3*b*.

In the embodiment illustrated in FIG. 2, the shoulders 3*a*′ are located at one end portion of the sleeve, although there is nothing to prevent the shoulders from being located at any other part of the sleeve, for example at its center portion.

The sleeve 3 is provided with a collar or flange 3*c*, which is placed at the other end portion of the sleeve.

Because the shaft 1 is cylindrical in shape and has a planar end face, the inner and outer surfaces of the sleeve 3 may also be cylindrical with planar end faces, and, moreover, the recess 2*a* of the knob may be cylindrical and have a planar end face.

Figure 4:
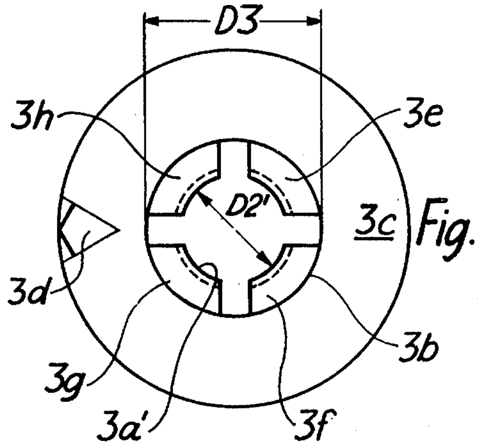

The sleeve 3 is illustrated in plan view in FIG. 4, where reference numerals corresponding to the views used in FIG. 2 have been inserted. The flange 3*c* carries a sign or mark 3*d*. As will be seen particularly from FIG. 4, the sleeve 3 is provided with a plurality of grooves so arranged as to form four resilient tonges 3*e*, 3*f*, 3*g* and 3*h*.

The sign or mark 3*d* shall naturally be placed on the sleeve 3 of a location which indicates the setting position of the knob 2.

The inner diameter "D2" is selected so that the sleeve 3 can readily be pushed over the shaft 1, but since the shoulders 3*a*' exhibit a diameter which is smaller than the diameter "D2" the tongues 3*e*–3*h* will abut against the cylindrical surface 1*a* of the shaft 1 and thereby the diameter "D3" will increase slightly. As illustrated in FIG. 3, the knob 2 has the form of a sleeve having an inner diameter which is already somewhat smaller than the outer diameter "D3" in the position shown in FIGS. 2 and 3, but which is still relatively smaller when the sleeve 3 is placed on the shaft 1.

When the sleeve 3 is located on the shaft 1 in the aforementioned position, with expanded diameter "D3", the knob 2 is pressed in over the outer surface 3*b* of the sleeve 3. This will cause the tongues 3*e*–3*h* to be compressed, at the same time the knob 2 will expand in a manner such as to expand the diameter "D4" and press over the outer surfaces 3*b*. The inner surface of the tongues are pressed against the shaft and the forces acting perpendicularly thereto result in a firm friction connection between sleeve and shaft.

The outer part 2*b* of the knob 2 is serrated or provided with similar gripping means, thereby to facilitate turning of the knob 2.

In FIG. 1, the shaft 1 is provided with a stop element 1*b*, the intention being that the flange 3*c* shall be brought into abutment with the stop 1*b* so that the knob 2 can be pressed thereafter over the outer surface 3*b* of the sleeve 3. In this way it is ensured that the sleeve 3*b* is not displaced axially along the shaft 1. In this instance, however, there is an axial pressure on the shaft 1.

Figure 5:
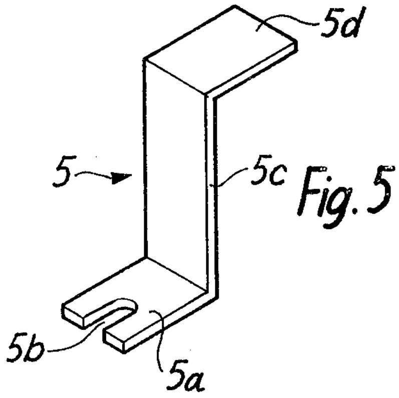

It is normal, however, for the shaft 1 not to be provided with a stop 1*b*, but to be perfectly planar, and in this case it is necessary to take up the pressure exerted by the knob 2 and acting axially on the shaft, and to change the direction in which said pressure acts. To this end there is provided a separate stop, which is illustrated in FIG. 5 and which comprises an angled element 5 having a part 5*a* which exhibits a U-shaped recess 5*b* adapted to encircle the shaft 1. In this way, the part 5*a* serves as a stop or abutment surface for the sleeve 3 when it is moved along the shaft 1. The part 5*a* is arranged to co-act with an angled elongate part 5*c* which is provided at its other end with a handle 5*d*.

It is not unusual, however, for the coupling arrangement to be used as a knob which shall be mounted on a shaft belonging to a rheostat 6. The rheostat 6 is attached, via electrical coupling connections 6*a*, to a printed circuit card. The printed circuit card is referenced 7 and also carries a resistance 8 and a capacitor 9. The resistance 8 and capacitor 9 are of a known type and are attached to the printed circuit card 7. The card 7 is placed in a frame 10 in a manner not illustrated. The frame 10 is provided with a recess 10*a* for holding a front plate 11. The front plate 11 is so dimensioned that it is able to take up axially directed forces. By fitting the sleeve 3 over the shaft 1 until the sleeve abuts the front plate 11, and then pressing the knob 2 over the sleeve 3, the axial forces occurring will not be experienced by the shaft 1 but solely by the plate or cover 11. A mounting such as that illustrated in FIG. 6 is very common and it will readily be perceived that such constructions are particularly weak with regard to the holding of the rheostat 6 to the card 7. If a known type of knob should be pressed onto the shaft 1, both the rheostat 6 and the card 7 would flex or bend in a manner to deform the same, at least at the connecting point 6*a*.

According to the invention it is possible to mount the knob 2 on the shaft 1 without risking deformation, since the flange 3*c* of the sleeve 3 can now be brought into abutment with the plate 11.

In order to obtain a given distance between the flange 3*c* and the plate 11, a plate may be placed between the flange 3*c* and the plate 11 when placing the sleeve 3 and the knob 1 in position, which plate can be removed after coupling is completed.

Finally, it should be noted that the shoulders 3*a*' may be positioned anywhere in the sleeve 3. The shoulders 3*a*' may also be placed in such locations that they coincide with holes or grooves in the shaft 1. It will also be understood that the sleeve-shaped part, which in the illustrated embodiment is provided with four tongues, may have any number of tongues. If the material chosen is one which permits the sleeve-shaped part to be compressed when the outer part of the knob is pressed thereon, so that a sufficient pressure is obtained against the shaft, the tongues and grooves may be omitted. Indentations can, alternatively, be arranged on the knob 1.

The parts of the coupling arrangement, namely the knob 2, and the sleeve 3, are preferably made from a plastics material which is able to withstand the expansion experienced by the knob 2 when it is pressed over the sleeve 3, and is capable of withstanding the compression which takes place through the tongues 3*e*–3*h*, when the knob is pressed over said tongues. It is an advantage for the parts 2 and 3 to be formed from one and the same material, although there is nothing to prevent the sleeve 3 from being formed from a harder material than the knob 2.

A predetermined, high radial normal pressure between sleeve and shaft, alternatively between knob and sleeve, can be obtained either by reducing the diameter "D4" or by increasing the hardness of the material in the knob, or a combination of these measures.

The invention is not limited to the described and illustrated embodiments, but can be modified within the scope of the following claims.

What I claim is:

1. An arrangement for coupling a shaft and a knob and for causing the shaft to rotate when the knob is turned about its axis, said coupling arrangement comprising:

- a shaft having a cylindrically shaped outer surface and an end face, said outer surface having a constant diameter within the region of the coupling arrangement;
- a sleeve having:
  - a recess with an inner surface adapted to encircle said shaft, said inner surface having a diameter which is equal to said constant diameter of said shaft; and
  - a stop surface for limiting movement of a knob over the outer surface of said sleeve; and
- a knob made of a resilient material, said knob having a recess with an inner surface adapted to encircle said sleeve, the cross-sectional area of said knob recess being smaller than the cross-sectional area of the outer surface of said sleeve;

whereby said knob is adapted to be pressed over said sleeve so that its recess encircles the outer surface of said sleeve and the resiliency of said knob imparts a compressing force to said sleeve which acts upon said shaft and imparts a firm frictional engagement between said sleeve and said shaft and between said sleeve and said knob.

2. An arrangement for coupling a shaft and a knob and for causing the shaft to rotate when the knob is turned about its axis, said coupling arrangement comprising:

a shaft having a cylindrically shaped outer surface and an end face, said outer surface having a constant diameter within the region of the coupling arrangement;

a sleeve having:

a recess with an inner surface adapted to encircle said shaft, said inner surface having a diameter which is equal to said constant diameter of said shaft;

a stop surface for limiting movement of a knob over the outer surface of said sleeve; and a plurality of axially arranged grooves forming a plurality of resilient tongues; and a knob made of a resilient material, said knob having a recess with an inner surface adapted to encircle said sleeve, the cross-sectional area of said knob recess being smaller than the cross-sectional area of the outer surface of said sleeve;

whereby said knob is adapted to be pressed over said sleeve so that its recess encircles the outer surface of said sleeve and the resiliency of said knob imparts a compressing force to said sleeve which acts upon said shaft and imparts a firm frictional engagement between said sleeve and said shaft and between said sleeve and said knob.

3. An arrangement for coupling a shaft and a knob and for causing the shaft to rotate when the knob is turned about its axis, said coupling arrangement comprising:

a shaft having a cylindrically shaped outer surface and an end face, said outer surface having a constant diameter within the region of the coupling arrangement;

a sleeve having:

a recess with an inner surface adapted to encircle said shaft, said inner surface having a diameter which is equal to said constant diameter of said shaft;

a stop surface for limiting movement of a knob over the outer surface of said sleeve;

a flange having an indicator positioned thereon; and a knob made of a resilient material, said knob having a recess with an inner surface adapted to encircle said sleeve, the cross-sectional area of said knob recess being smaller than the cross-sectional area of the outer surface of said sleeve;

whereby said knob is adapted to be pressed over said sleeve so that its recess encircles the outer surface of said sleeve and the resiliency of said knob imparts a compressing force to said sleeve which acts upon said shaft and imparts a firm frictional engagement between said sleeve and said shaft and between said sleeve and said knob.

4. An arrangement for coupling a shaft and a knob and for causing the shaft to rotate when the knob is turned about its axis, said coupling arrangement comprising:

a shaft having a cylindrically shaped outer surface and an end face, said outer surface having a constant diameter within the region of the coupling arrangement;

a sleeve having:

a recess with an inner surface adapted to encircle said shaft, said inner surface having a diameter which is equal to said constant diameter of said shaft; and a stop surface for limiting movement of a knob over the outer surface of said sleeve;

a knob made of a resilient material, said knob having a recess with an inner surface adapted to encircle said sleeve, the cross-sectional area of said knob recess being smaller than the cross-sectional area of the outer surface of said sleeve;

whereby said knob is adapted to be pressed over said sleeve so that its recess encircles the outer surface of said sleeve and the resiliency of said knob imparts a compressing force to said sleeve which acts upon said shaft and imparts a firm frictional engagement between said sleeve and said shaft and between said sleeve and said knob;

and further including a support element which is independent of said shaft and which is arranged to abut said sleeve when said knob is pressed over said sleeve, to inhibit an axial force from being placed on said shaft during the pressing procedure.

5. A coupling arrangement according to claim 1, 2, 3 or 4, wherein the inner surface of said sleeve is provided with at least one shoulder which is urged into abutment with said shaft as a result of the compressive force exerted by said knob.

6. A coupling arrangement according to claim 5, wherein said shoulder is located at one end of said sleeve.

7. An arrangement for coupling a shaft and a knob and for causing the shaft to rotate when the knob is turned about its axis, said coupling arrangement comprising:

a shaft having a cylindrically shaped outer surface and an end face, said outer surface having a constant diameter within the region of the coupling arrangement;

a sleeve having:

a recess with an inner surface adapted to encircle said shaft, said inner surface having a diameter which is equal to said constant diameter of said shaft;

a stop surface for limiting movement of a knob over the outer surface of said sleeve;

a plurality of axially arranged grooves forming a plurality of resilient tongues;

a flange having an indicator positioned thereon; and at least one shoulder provided on the inner surface of said sleeve which is urged into abutment with said shaft as a result of the compressive force exerted by said knob;

a knob made of a resilient material, said knob having a recess with an inner surface adapted to encircle said sleeve, the cross-sectional area of said knob recess being smaller than the cross-sectional area of the outer surface of said sleeve;

whereby said knob is adapted to be pressed over said sleeve so that its recess encircles the outer surface of said sleeve and the resiliency of said knob imparts a compressing force to said sleeve which acts upon said shaft and imparts a firm frictional engagement between said sleeve and said shaft;

and further including a support element which is independent of said shaft and which is arranged to abut said sleeve when said knob is pressed over said sleeve, to inhibit an axial force from being placed on said shaft during the pressing procedure.

8. A coupling arrangement according to claim 1, 2, 3, 4 or 7 further including a support member having a surface which faces said sleeve, said support member being adapted to absorb the axial force exerted when said knob is pressed over said sleeve.

* * * * *